United States Patent
Schellekens

(10) Patent No.: US 12,420,732 B2
(45) Date of Patent: Sep. 23, 2025

(54) FRONT END PANEL FOR AN ELECTRIC VEHICLE

(71) Applicant: SABIC Global Technologies B.V., Bergen op Zoom (NL)

(72) Inventor: Geert Jan Schellekens, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 325 days.

(21) Appl. No.: 18/078,309

(22) Filed: Dec. 9, 2022

(65) Prior Publication Data
US 2023/0097463 A1 Mar. 30, 2023

Related U.S. Application Data

(63) Continuation of application No. 16/643,208, filed as application No. PCT/EP2018/078183 on Oct. 16, 2018, now Pat. No. 11,524,644.

(30) Foreign Application Priority Data

Oct. 17, 2017 (EP) ..................................... 17196854

(51) Int. Cl.
*B60R 19/52* (2006.01)
*B60R 13/00* (2006.01)

(52) U.S. Cl.
CPC ............ *B60R 19/52* (2013.01); *B60R 13/005* (2013.01); *B60R 2019/525* (2013.01); *B60R 2019/527* (2013.01)

(58) Field of Classification Search
CPC ....... B60R 1/002; B60R 19/52; B60R 19/525; B60R 2019/527; B60R 13/005
See application file for complete search history.

(56) References Cited

U.S. PATENT DOCUMENTS 7,597,383 B2 10/2009 Itou et al.
7,690,703 B2 4/2010 Maruko
(Continued)

FOREIGN PATENT DOCUMENTS

| JP | 2013164913 A | * | 8/2013 | ........... B60Q 1/0023 |
| JP | 2013205530 A | * | 10/2013 | |
| JP | 2014070899 A | * | 4/2014 | |

OTHER PUBLICATIONS

International Search Report; International Application No. PCT/EP2018/078183; International Filing Date: Oct. 16, 2018; Date of Mailing: Mar. 12, 2018; 4 pages.
(Continued)

*Primary Examiner* — Daniel J Colilla
(74) *Attorney, Agent, or Firm* — CANTOR COLBURN LLP

(57) ABSTRACT

The invention relates to a front end panel assembly (100) for an electric vehicle (300), the assembly comprising: —an at least partially optically transparent laminate sheet (108) having side edges, comprising an optically transparent thermoplastic substrate and at least one protective layer; —a spacing structure (112) comprising a base (110) and a peripheral upstanding wall (120) extending from the base, wherein the upstanding wall connects to the laminate at or near at least part of the side edges of the laminate, such that a space (122) is formed and enclosed between the laminate sheet and the spacing structure, and wherein the at least one protective layer of the laminate faces away from the spacing structure.

16 Claims, 2 Drawing Sheets

(56) References Cited

U.S. PATENT DOCUMENTS

| | | | |
|---|---|---|---|
| 7,887,125 B2 | 2/2011 | Tazaki et al. | |
| 9,016,772 B2 | 4/2015 | Townson et al. | |
| 9,162,641 B2 | 10/2015 | Townson et al. | |
| 9,682,616 B2 | 6/2017 | Berthevas et al. | |
| 9,758,031 B2 | 9/2017 | Edwards et al. | |
| 9,776,585 B2 | 10/2017 | Wey et al. | |
| 9,969,342 B2 | 5/2018 | Klop et al. | |
| 2004/0125023 A1 | 7/2004 | Fujii et al. | |
| 2012/0256543 A1* | 10/2012 | Marcove | B60Q 1/2696 362/540 |
| 2013/0293104 A1 | 11/2013 | Wu | |
| 2014/0191538 A1 | 7/2014 | Townson et al. | |
| 2017/0113628 A1 | 4/2017 | Sugiura et al. | |
| 2017/0165884 A1 | 6/2017 | Benyahia et al. | |
| 2017/0355302 A1* | 12/2017 | Kuramitsu | G02B 6/002 |
| 2019/0061646 A1* | 2/2019 | Huttenlocher | B60Q 3/00 |
| 2020/0238934 A1 | 7/2020 | Schellekens | |
| 2021/0155168 A1* | 5/2021 | Hirotani | G09F 21/048 |

OTHER PUBLICATIONS

Written Opinion; International Application No. PCT/EP2018/078183; International Filing Date: Oct. 16, 2018; Date of Mailing: Mar. 12, 2018; 5 pages.

\* cited by examiner

FRONT END PANEL FOR AN ELECTRIC VEHICLE

CROSS REFERENCE TO RELATED APPLICATIONS

This application claims priority to and the benefit of U.S. application Ser. No. 16/643,208, filed Feb. 28, 2020, which is the National Phase Entry of International Application No. PCT/EP2018/078183, filed Oct. 16, 2018, which claims the benefit of European Application No. 17196854.8, filed Oct. 17, 2017, all of which are incorporated by reference in their entireties herein.

BACKGROUND OF THE INVENTION

Field of the Invention

The present invention relates to a front end panel for an electric vehicle, comprising a polycarbonate sheet layer and a spacing structure or carrier structure. The invention also relates to a front end panel module for an electric vehicle, comprising a plurality of such front end panel assemblies. Furthermore, the invention relates to a vehicle comprising such a front end.

Description of the Related Art

Transforming the automotive industry from fuel driven or hybrid cars to electricity driven cars has numerous consequences for engine design, but also for the exterior design of a car, a motor vehicle, in particular for the front fascia.

The front fascia of a vehicle, in particular a car, comprises a grille or a grating forming a barrier or a screen, which principal function is to admit cooling air to the car's radiator. However, it also takes a prominent place in attracting buyers for a car. The grille is often a distinctive style element and many OEMs use it as their primary brand identifier.

With the introduction of electric vehicles, the principal function of allowing cool air to the radiator is no longer. This opens up new design possibilities where the grille can be replaced by a closed component.

BRIEF SUMMARY OF THE INVENTION

According to the invention, there is provided a front end panel assembly for an electric vehicle, the assembly comprising:
an at least partially optically transparent laminate sheet having side edges, comprising an optically transparent thermoplastic substrate and at least one protective layer;
a spacing structure comprising a base and a peripheral upstanding wall extending from the base, wherein the upstanding wall connects to the laminate at or near at least part of the side edges of the laminate, such that a space is formed and enclosed between the laminate sheet and the spacing structure, and wherein the at least one protective layer of the laminate faces away from the spacing structure.

The assembly forms a closed space or box having one at least partially optically transparent side where the laminate is provided, and multiple optically transparent or opaque, or a combination thereof, sides where the spacing structure or carrier structure is provided. The laminate sheet and the base of the spacing structure are spaced apart by the peripheral upstanding wall of the spacing structure. The upstanding wall of the spacing structure connects to the laminate sheet at or near the peripheral side edge of the laminate sheet, such that the assembly forms a closed unit. The laminate sheet may be optically transparent over its entire surface area, but a partially opaque or even entirely opaque laminate sheet may be possible as well.

According to an embodiment, the laminate sheet comprises a pattern layer facing the spacing structure, which pattern layer renders part of the laminate opaque for pattern formation. At an inside of the assembly, the laminate sheet may comprise a layer that forms a pattern when light reflects on or radiates through the laminate sheet. The pattern may be formed by rendering part of the laminate sheet opaque or with a different optically transparency than the surrounding areas of the laminate sheet.

The optically transparent thermoplastic substrate is transparent to at least light visible to the human eye, wherein the transmittance of visible light is above 30%. The transparent thermoplastic substrate may be combined with an opaque thermoplastic layer, wherein opaque is defined as having a visible light transmittance of up to 30%. The transparent and opaque thermoplastic layers may comprise similar materials, or dissimilar materials. Both the opaque and optically transparent layers may be colored, wherein the optically transparent substrate still appears clear.

According to an embodiment, the pattern layer may comprise a foil joined at a surface facing the spacing structure. The foil may be overmoulded with the optically transparent substrate, or can be a foil that is provided to the substrate at a later stage. Alternatively, the pattern layer may be formed by a pattern print layer on the substrate, such as a screen-print. Preferably, the pattern layer comprises an overmoulded thermoplastic layer having an open structure. The overmoulded pattern layer may be provided onto the optically transparent substrate during a two shot injection moulding process, also called 2K-IM. In a first injection moulding step, the substrate is made. In a subsequent second injection moulding step, the pattern layer is moulded onto a first surface of the substrate. The protective layer is then applied on a second surface of the substrate, opposite of the first surface. The protective layer may comprise a scratch resistance layer and/or UV resistant layer, or any protective layer that would render the substrate suitable for environmental exposure.

According to a further embodiment, an inner surface at least the base of the spacing structure comprises a mirror for reflection of visible light, and the inner surface of the laminate sheet facing the spacing structure comprises a semi-transparent mirror, such that an infinity mirror is created in the front end panel assembly. The entire inner surface of the spacing structure may be provided with the reflective mirror, including the inner surface of the peripheral upstanding wall. The infinity minor has its optimal effect when used in combination with a light module, such as an LED light module.

According to an embodiment, the assembly further comprises a light module enclosed within the space formed between the laminate sheet and the spacing structure. The light module may be provided as a lighting pattern or lighting sculpture within the space between the laminate sheet and the spacing structure. In that case, the lighting module may replace the patter layer at the inside of the laminate sheet. Alternatively, the lighting module may be placed behind the pattern layer to enhance and light the pattern upon turning on of the lighting module.

According to another embodiment, the laminate sheet comprises a peripheral opaque band that extends from the side edge of the laminate sheet. The opaque band or strip may be used to hide any areas of connection between the laminate sheet and the spacing structure from the eye to enhance the aesthetic look of the front panel assembly. Preferably, the opaque band is part of the pattern layer, and may be used as a starting point of the open structure part of the pattern layer.

The spacing structure preferably comprises a thermoplastic material, for instance a polyolefin such as PE or PP; polybutylene terephthalate (PBT); acrylonitrile-butadiene-styrene (ABS); acrylic-styrene-acrylonitrile (ASA); polycarbonate; polycarbonate/PET blends; polycarbonate/ABS blends; polycarbonate/ASA blends; copolycarbonate-polyesters; acrylonitrile-(ethylene-polypropylene diamine modified)-styrene (AES); phenylene ether resins (PPO); PPO/PS blends; blends of polyphenylene ether/polyamide; polyamides; phenylene sulfide resins; polyvinyl chloride (PVC); high impact polystyrene (HIPS);

low/high density polyethylene (L/HDPE); polypropylene (PP); expanded polypropylene (EPP); poly(methyl methacrylate); and thermoplastic olefins (TPO). The polymers or thermoplastic materials may be linear polymers or branched polymers or combinations thereof. The plastic can optionally be reinforced, e.g., with fibers, particles, flakes, as well as combinations comprising at least one of the foregoing, such as especially for example long glass fibers, short glass fibers, glass beads, talc, mica, inorganic fillers, natural fibers, conductive fillers and/or carbon fibers. For example, the thermoplastic second component can be formed from STAMAX® materials, a long glass fiber reinforced polypropylene commercially available from SABIC.

The optically transparent thermoplastic material of the laminate sheet preferably comprises a polycarbonate or a poly(methyl)methacrylate, or any other optically transparent thermoplastic material. The laminate sheet may be a flat panel, or may have a slight curvature, i.e. have a convex shape, for instance to have a smooth transition and/or to be flush with the further components of the front fascia of a vehicle.

According to an embodiment, the base of the spacing structure has an inner surface facing the laminate sheet. The inner surface may be smooth, textured and/or corrugated. In addition, or alternatively, the inner surface may be surface treated. The inner surface of the spacing structure is used to create depth or a 3D effect in the front end panel assembly.

When it is desired to integrate electronic components into the assembly, it may be favourable to have the assembly comprising a receiving portion for an electronic component for integration with the assembly. Preferably, the receiving portion extends to the laminate sheet and is at least partially enclosed by the spacing structure. The receiving portion may receive any type of electronic component, including a LiDAR module for anticipated self-driving cars. The front end panel assembly would be highly suitable for integrating such components.

The invention also relates to a front end panel module for an electric vehicle, comprising a plurality of front end panel assemblies as described above. As an example, the front end panel module may comprise three front end panel assemblies, wherein two are mirrored images of each other and a third is placed in the middle to form a symmetric front end panel module. The two mirrored assemblies may be partially optically transparent with a pattern or a light module, whereas the third and middle assembly may comprise an opaque laminate sheet, such that the middle assembly may function as an integration box for electronic components while hiding them from view.

The invention further relates to an electric vehicle comprising a front end panel assembly or a front end panel module as described above. The front end panel assembly or front end panel module may form a part of the front fascia of the vehicle, or may form the entire front fascia of the vehicle. According to an embodiment, the assembly or the module is flanked by a pair of head lights, thereby shaping a symmetrical front for the vehicle.

BRIEF DESCRIPTION OF THE DRAWINGS

The features and advantages of the invention will be further appreciated upon reference to the following drawings of a number of exemplary embodiments, in which:

FIG. 1b shows a cross section along A-A of the front end panel assembly of FIG. 1a;

DESCRIPTION OF ILLUSTRATIVE EMBODIMENTS

Figure 1A:
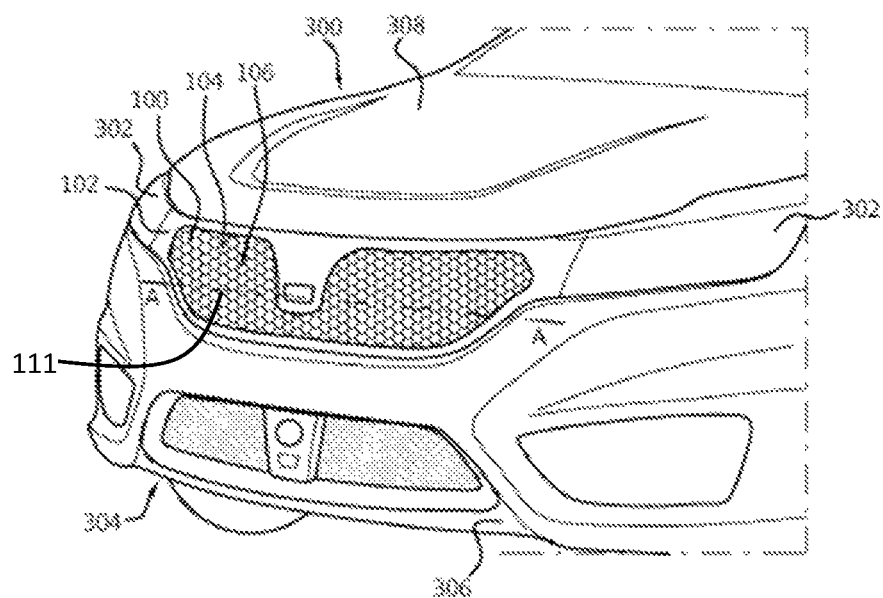
FIG. 1a shows a front end panel assembly according to a first embodiment of the present invention in perspective view.

FIG. 1a shows a front end panel assembly 100 according to a first embodiment of the present invention in perspective view. The front end panel assembly 100 is provided as a component of a front fascia 304 of a vehicle 300. The front end panel assembly 100 comprises a laminate sheet 108 (see FIG. 1b) at its front, which laminate that is partially opaque at an opaque peripheral band 102 and at the opaque lines 104 of a pattern 106. The front end panel assembly is located between a pair of head lights 302 at its sides. At its top end, the hood 308 of the vehicle is located; at its bottom end a bumper assembly 306 of the vehicle is provided, see also FIG. 3. Next to the opaque peripheral band and the opaque pattern lines, the pattern 106 comprises an open structured portion 111 where the optically transparent laminate sheet 108 (see FIGS. 1a and 1b) is visible. Behind the laminate sheet, a corrugated base 110 of the spacing structure 112 (see FIG. 1b) is shown.

Figure 1B:
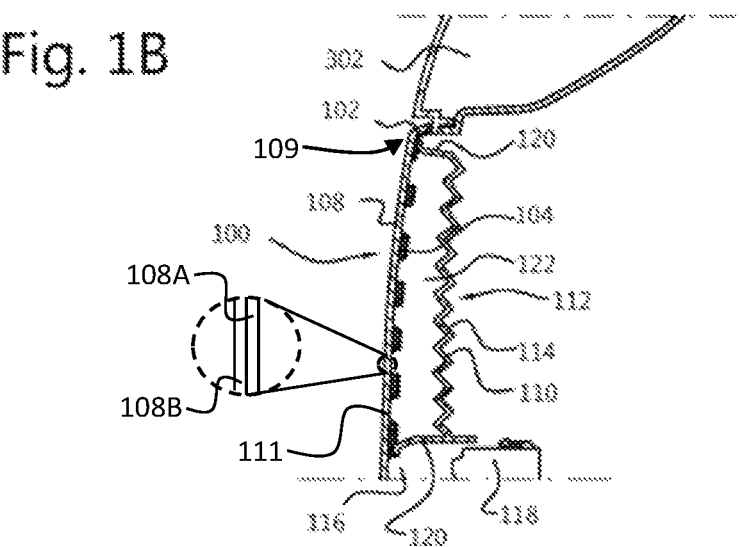

FIG. 1b shows a cross section along A-A of the front end panel assembly of FIG. 1a. The front end panel assembly 100 is shown to have a laminate sheet 108 that is located at the front end of the vehicle front fascia, see also FIG. 1a, in between the head light assemblies 302. The external surface of the laminate sheet 108 comprises one or more protective layers 108B to protect the laminate, in particular its thermoplastic substrate, from environmental factors, such as abrasion and ultraviolet radiation. The laminate sheet 108 comprises an optically transparent substrate 108A, preferably of a polycarbonate resin. In addition, the laminate sheet 108 has a pattern layer 106 made up with opaque lines 104. The opaque band 102 may be part of the pattern layer 106. In between the opaque lines 104 and bands 102, the optically transparent laminate sheet is exposed. Viewed from the laminate sheet 108, a spacing structure 112 is provided behind the laminate sheet 108. The spacing structure 112 comprises a base 110 and a peripheral upstanding wall 120 that extends from the base 110 and connects with the laminate sheet 108 at or near its side edges 109, or instance at the location of the peripheral opaque band 102. The peripheral upstanding wall 120 spaces the base 110 from the laminate sheet 108. The laminate sheet 108 and the spacing structure 112 together enclose a space 122. The base 110 in FIG. 1b is corrugated with zigzag waves. Any other corrugation wave may be used as well. The corrugated base adds a 3D effect to the front end panel assembly, in particular to the pattern provided on the laminate sheet. An inner surface 114 of the base 110 may be provided with a foil, a mirror, a screen print or any other surface enhancing layer to optimize the 3D effect.

The front end panel assembly further comprises a receiving portion 116 to receive an electronic component 118, such as a sensor or a LiDAR component, or a light module. The receiving portion 116 extends through the base 119 to the laminate sheet 108 and is enclosed by the peripheral wall 120 of the spacing structure 112.

Figure 2:
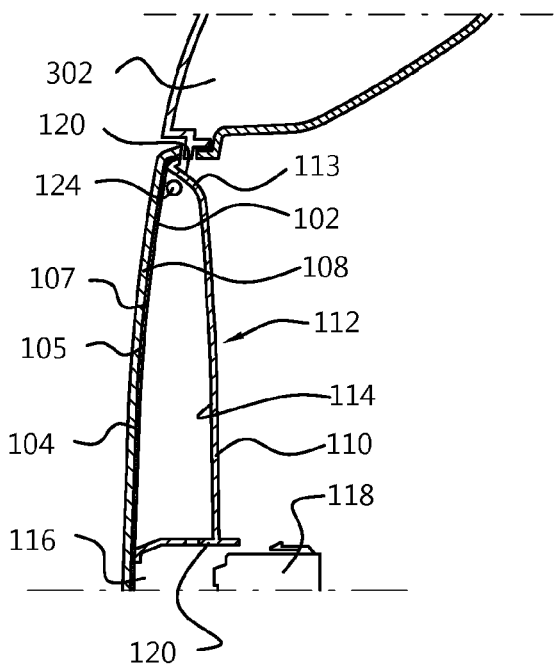
FIG. 2 shows a cross section of a front end panel assembly according to a second embodiment of the present invention.

FIG. 2 shows a cross section of a front end panel assembly 100 according to a second embodiment of the present invention. This second embodiment shows the laminate sheet 108 with a pattern 106 that is a foil 107 with a pre-fabricated pattern made of optically transparent and opaque regions 104, 105, including a peripheral opaque band 102 at the side edges of the laminate sheet 108. The spacing structure 112 comprises a base 110 and a peripheral upstanding wall 120 that extends from the base 110, in FIG. 2 via a smoothly curved transition region 113 towards the side edge of the laminate sheet 108, or substantially perpendicular at the receiving portion 116.

The inner surface 114 of the spacing structure may be laser marked to include color change due to chemical/molecular alteration, charring, foaming, melting, ablation, and more. This laser marking adds to the 3D effect of the pattern and the spacing between the laminate sheet and the base of the spacing structure. Between the base and the laminate sheet, the front end panel assembly may further comprise a light module 124 for highlighting the pattern and the 3D effect of the front end panel assembly. The light module 124 may also be used for design purposes, such as brand identity or for a welcoming signal to a driver of a vehicle.

Figure 3:
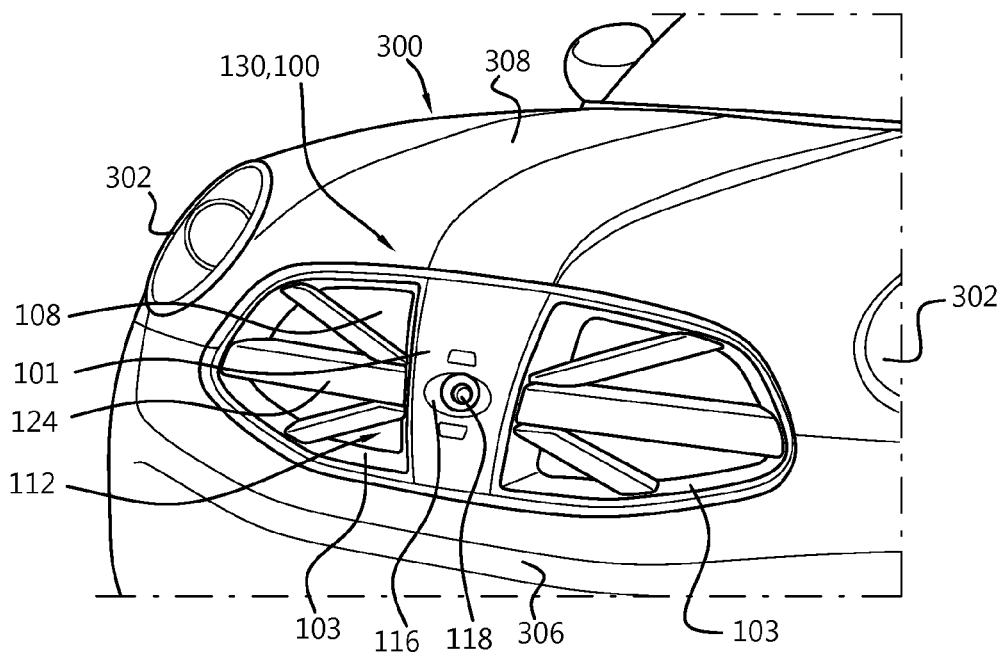
FIG. 3 shows a perspective view of a front end panel module comprising a front end panel assembly according to a third embodiment of the present invention.

FIG. 3 shows a perspective view of a front end panel module 130 comprising a front end panel assembly 100, 101, 103 according to a third embodiment of the present invention.

Three front end panel assemblies 100, 101, 103 together form a front end panel module 130. A middle front end panel assembly 101 has a laminate sheet that is largely opaque, except for one or more receiving portions 116 for electronic components 118. Two side front end panel assemblies 103 provided on each side of the middle front end panel assembly 101, comprise a largely optically transparent laminate sheet 108 and a spacing structure or carrier structure 112 placed behind the laminate sheet. Within the space enclosed by the laminate structure 108 and the spacing structure 112 a light module 124 is placed. This lighting module 124 is designed in a certain pattern that is visible when the light module is turned off, and highlighted when the light module is turned on.

LIST OF ITEMS

100. Front end panel assembly
101. Middle front end panel assembly
102. Peripheral opaque band
103. Side front end panel assembly
104. Opaque pattern line
105. Transparent pattern part
106. Pattern layer
107. Foil
108. Laminate sheet
108A. Optically transparent thermoplastic substrate
108B. At least one protective layer
109. Side Edge
110. Base
111. Open structured portion
112. Spacing structure
113. Transition region
114. Inner surface of base
116. Receiving portion
118. Electronic component
120. Peripheral upstanding wall
122. Space
124. Light module
130. Front end panel module
300. Vehicle
302. Head light
304. Front fascia
306. Bumper assembly
308. Hood

The invention claimed is:

1. A front end panel assembly for an electric vehicle, the assembly comprising:
   an at least partially optically transparent laminate sheet having side edges, comprising an optically transparent thermoplastic substrate and a pattern layer comprising a peripheral opaque band that extends from the side edge of the laminate sheet;
   a spacing structure comprising a base and a peripheral upstanding wall extending from the base, wherein the upstanding wall connects to the laminate sheet at the peripheral opaque band, such that a closed space is formed, wherein the peripheral opaque band hides an area of connection between the laminate sheet and the spacing structure; and
   a receiving portion for an electronic component for integration with the assembly,
   wherein the receiving portion extends through the base to the laminate sheet and is at least partially enclosed by the spacing structure.

2. The assembly according to claim 1, wherein the laminate sheet comprises at least one protective layer; and
   wherein the at least one protective layer of the laminate sheet faces away from the spacing structure.

3. The assembly according to claim 1, further comprising a light module enclosed within the closed space formed between the laminate sheet and the spacing structure.

4. The assembly according to claim 1, wherein the base of the spacing structure has an inner surface facing the laminate sheet, and wherein the inner surface is smooth, textured and/or corrugated.

5. The assembly according to claim 1, wherein an inner surface of at least the base of the spacing structure comprises a mirror for reflection of visible light, and an inner surface of the laminate sheet facing the spacing structure comprises a semi-transparent mirror, such that an infinity mirror is created in the front end panel assembly.

6. The assembly according to claim 1, further comprising a light module enclosed within the closed space formed between the laminate sheet and the spacing structure;
   wherein the spacing structure comprises a thermoplastic material;
   wherein the base of the spacing structure has an inner surface facing the laminate sheet, and wherein the inner surface is smooth, textured and/or corrugated; and wherein an inner surface of at least the base of the spacing structure comprises a mirror for reflection of visible light, and an inner surface of the laminate sheet facing the spacing structure comprises a semi-transparent mirror, such that an infinity mirror is created in the front end panel assembly.

7. The assembly according to claim 1, wherein a top end of the assembly is configured to be located next to a hood of the electric vehicle and a bottom end of the assembly is configured to be located next to a bumper assembly of the electric vehicle.

8. A closed grille panel assembly for an electric vehicle, the assembly comprising:
- an at least partially optically transparent laminate sheet having side edges, comprising an optically transparent thermoplastic substrate and a pattern layer comprising a peripheral opaque band that extends from the side edge of the laminate sheet, wherein the at least partially optically transparent laminate sheet is shaped to sit flush with components of a front fascia;
- a spacing structure comprising a base and a peripheral upstanding wall extending from the base, wherein the upstanding wall connects to the laminate sheet at the peripheral opaque band, such that a closed space is formed, wherein the peripheral opaque band hides an area of connection between the laminate sheet and the spacing structure; and
- a receiving portion for an electronic component for integration with the assembly,
- wherein the receiving portion extends through the base to the laminate sheet and is at least partially enclosed by the spacing structure.

9. The assembly according to claim 8, wherein the laminate sheet comprises at least one protective layer; and
- wherein the at least one protective layer of the laminate sheet faces away from the spacing structure.

10. The assembly according to claim 8, further comprising a light module enclosed within the closed space formed between the laminate sheet and the spacing structure.

11. The assembly according to claim 8, wherein the base of the spacing structure has an inner surface facing the laminate sheet, and wherein the inner surface is smooth, textured and/or corrugated.

12. The assembly according to claim 8, wherein an inner surface of at least the base of the spacing structure comprises a mirror for reflection of visible light, and an inner surface of the laminate sheet facing the spacing structure comprises a semi-transparent mirror, such that an infinity mirror is created in the closed grille panel assembly.

13. The assembly according to claim 8, further comprising a light module enclosed within the closed space formed between the laminate sheet and the spacing structure;
- wherein the spacing structure comprises a thermoplastic material;
- wherein the base of the spacing structure has an inner surface facing the laminate sheet, and wherein the inner surface is smooth, textured and/or corrugated; and
- wherein an inner surface of at least the base of the spacing structure comprises a mirror for reflection of visible light, and an inner surface of the laminate sheet facing the spacing structure comprises a semi-transparent mirror, such that an infinity mirror is created in the closed grille panel assembly.

14. A front end panel assembly for an electric vehicle, the assembly comprising:
- an at least partially optically transparent laminate sheet having side edges, comprising an optically transparent thermoplastic substrate and a pattern layer comprising a peripheral opaque band that extends from the side edge of the laminate sheet;
- opaque lines, between which the laminate sheet is exposed; and
- a spacing structure comprising a base and a peripheral upstanding wall extending from the base, wherein the upstanding wall connects to the laminate sheet at the peripheral opaque band, such that a closed space is formed, wherein the peripheral opaque band hides an area of connection between the laminate sheet and the spacing structure.

15. The assembly according to claim 14, wherein the opaque lines are in the closed space.

16. The assembly according to claim 14, wherein a top end of the assembly is configured to be located next to a hood of the electric vehicle and a bottom end of the assembly is configured to be located next to a bumper assembly of the electric vehicle.

* * * * *